United States Patent [19]

Schaible

[11] 4,229,620
[45] Oct. 21, 1980

[54] MOBILE RADIOTELEPHONE STATION TWO-WAY RANGING SYSTEM

[75] Inventor: Clifford W. Schaible, Morristown, N.J.

[73] Assignee: Bell Telephone Laboratories, Incorporated, Murray Hill, N.J.

[21] Appl. No.: 959,095

[22] Filed: Nov. 9, 1978

[51] Int. Cl.³ .................................................. H04Q 7/04
[52] U.S. Cl. ............................ 179/2 EB; 343/112 D; 455/31
[58] Field of Search ................. 179/2 EB; 325/51, 52, 325/53, 55, 64, 466, 478; 343/177, 200, 205, 112 R, 112 D

[56] References Cited

U.S. PATENT DOCUMENTS

| | | | |
|---|---|---|---|
| 3,663,762 | 5/1972 | Joel, Jr. | 179/2 EB |
| 3,746,991 | 7/1973 | Gautney | 325/55 |
| 3,848,254 | 11/1974 | Drebinger et al. | 343/112 R |
| 3,922,677 | 11/1975 | Tomkewitsch et al. | 343/112 R |
| 4,025,853 | 5/1977 | Addeo | 325/55 |

OTHER PUBLICATIONS

"High Capacity Mobile Telephone System Technical Report", (filed in F.C.C. Docket 18262), Dec. 1971, prepared by Bell Laboratories, pp. 3-13 through 3-20. "Effects of Multipath Transmission on the Measured Propagation Delay of an FM Signal", IEEE Transactions on Vehicular Technology, vol. VT-18, No. 1, May 1969, pp. 44-52, by J. S. Engel.

*Primary Examiner*—Bernard Konick
*Assistant Examiner*—Joseph A. Popek
*Attorney, Agent, or Firm*—Charles S. Phelan

[57] ABSTRACT

Some cellular mobile radiotelephone systems use tones for certain call connection supervisory functions on radio links. The presence of the correct tone in a received radio channel call signal is determined by using the received signal for producing (32) a lower frequency tone that is readily selectable (36) from similar tones produced in response to incorrect supervisory tones. The same received call signal is also separately processed to produce (41, 53) supervisory tone phase information that is indicative of range between communicating stations. Several circuits (72; 40 and 46; 59-62) are shown for enhancing the accuracy of the produced phase information of the correct tone.

14 Claims, 3 Drawing Figures

D/R=4.6
N=7 SETS

MOBILE RADIOTELEPHONE STATION TWO-WAY RANGING SYSTEM

BACKGROUND OF THE INVENTION

This invention relates to mobile radiotelephone systems and particularly to such systems which employ a tone for supervision of call status.

Cellular radio communication systems are being increasingly considered as arrangements which can allow substantially higher numbers of mobile radiotelephone subscribers to have access to a relatively limited number of radio communication channels. One form of such a cellular system is described in a report entitled *High Capacity Mobile Telephone System Technical Report*, Dec. 1971, prepared by Bell Telephone Laboratories, Incorporated, and filed with the *Federal Communications Commission* in that month under Docket 18262. It has been proposed in such a cellular radio system to require each base station, sometimes called a cell site, which communicates on a set of channels in common with other base stations that are within a potential co-channel interference radius, to combine with its access, or call setup, channel signals a supervisory tone which is unique to that base station among the group of possibly interfering base stations. Such a tone is transponded by a mobile unit receiving that channel. Any base station receiving the transponded tone employs it to determine whether or not the transponding mobile station has been captured by an interfering base station and whether or not the receiving base station has captured an interfering mobile station. In this context the term "captured" is utilized with reference to the well-known phenomenon of frequency modulation capture. Three examples of cellular mobile radiotelephone systems are found in the U.S. Pat. Nos. 3,663,762 of A. E. Joel, 3,898,380 of G. D. Wells et al., and 3,906,166 of M. Cooper et al.

It is desirable in the cellular type of system to provide some indication of the location of a mobile unit engaged in a call connection in the system. The patentees in the three aforementioned patents all employ some form of signal level determination as an indication of mobile unit position so that a decision can be made as to when to handoff a mobile unit between adjacent cell base stations. However, the aforementioned supervisory tone is also useful for propagation delay ranging as indicated for example at page 3-17 in the aforementioned technical report. Another propagation delay system is indicated at page 4-64 of "An Application for a Developmental Cellular Mobile and Portable Radiotelephone System in the Washington-Baltimore Northern-Virginia Area". This application was submitted to the Federal Communications Commission by the American Radio Telephone Service, Incorporated and dated Feb. 14, 1977.

Propagation delay ranging, or phase ranging as it is sometimes called, is accomplished in the mentioned technical report by utilizing one of plural system supervisory tones near the upper end of the voice band and which are usually very close together in the frequency spectrum, e.g., within about ±0.5% of one another. Any use of the supervisory audible tone, including its use for ranging requires a receiving station to determine that it is receiving the true tone for its channel. Detection of a certain one of several such closely spaced tones by conventional filtering techniques usually requires complex and/or difficult-to-integrate circuits. Another technique that has been proposed, for example, in the E. J. Addeo, U.S. Pat. No. 4,025,853, depends upon product modulating a transponded version of the tone, after selection by a phase-locked loop, with a transmitted version of the tone. Then the modulator output is band-pass filtered in a band including the possible difference frequencies among the system supervisory tones. If no such difference frequency is detected, it is presumed that the correct supervisory tone is being received. If such a difference frequency is detected, it is presumed that the wrong supervisory tone is being received, i.e., that interference is present from another usage of the same channel in the system, and a call in progress is terminated. It has been found that reflections from topological features can cause multipath sidebands in the difference frequency band at the modulator output and of sufficient amplitude to cause call termination even when the correct supervisory tone is present.

One propagation delay ranging method uses a phase comparison of transmitted and transponded tones as already indicated. This is sometimes called two-way ranging, and the phase comparison output is integrated to produce the range information. At least two other problems of a two-way ranging system include factors such as manufacturing tolerance variations in comparator circuit logic which adversely affect integration accuracy and also erroneous integration performed while received signals including a correct received supervisory tone are in fade, a pervasive problem in mobile radiotelephone systems. Another propagation delay ranging method is a hyperbola scheme considered in a paper by W. T. Warren et al., entitled "Vehicle Location System Experiment" appearing in the *IEEE Transactions on Vehicular Technology*, Volume VT-21, Number 3, August 1972, at pages 92–101. Those authors refer to a two-way ranging technique as less advantageous than the hyperbola, or so called trilateration, system because in the latter each phase comparison is preceded by only one exposure of the measuring tone to channel noise interference and propagation effects.

SUMMARY OF THE INVENTION

In one embodiment of the present invention, a predetermined tone is derived from a received signal and processed in a two-way-type phase ranging, i.e., propagation delay, circuit to determine approximately the distance from the station which had provided the received signal. A separate processing circuit develops a signal to inhibit erroneous range processing during radio signal reception fades.

In a mobile radiotelephone system where the predetermined tone is one of plural supervisory tones spectrally spaced from one another by narrow bands much smaller in frequency than the tones themselves, the received signal is used to produce, for a correct signal, a predetermined control tone of a frequency that is of approximately the same order of magnitude as the spacing bandwidth. That control tone is readily selectable from erroneous control tones resulting from other supervisory tones of incorrect signals.

In an embodiment of the invention using a phase comparison and integration algorithm for ranging, relatively accurate range output indications are ensured by providing first and second selectable bias sources of different values that are independent of component tolerances in at least the phase comparison part of the circuit. Output from the latter circuit part is then used to select one or the other of the bias sources for application to the integrating part of the circuit.

Also, for systems wherein the primary distance out to which range is to be measured corresponds to more than half a wavelength of the highest frequency in the band of the surpervisory tones, the further tone and a reference tone against which phase is compared are divided down in frequency before phase comparison to a level such that the half wavelength of the divided wave is at least equal to that primary distance.

BRIEF DECRIPTION OF THE DRAWING

A more complete understanding of the invention may be obtained from a consideration of the following detailed description together with the appended claims and the attached drawing in which FIG. 1 is a diagram of cells and channel assignments indicating channel reuse in a previously proposed radiotelephone communication system;

FIG. 2 is a simplified functional diagram indicating potential multipath interference and cochannel interference paths among radiotelephone units; and FIG. 3 is a simplified block and line diagram of cell base station equipment utilizing the invention for the detection and utilization of supervisory audible tones in the system of the type illustrated in FIGS. 1 and 2.

DETAILED DESCRIPTION

Figure 1:
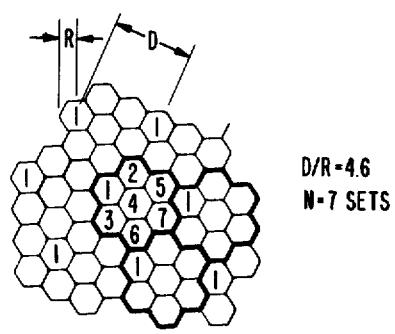

FIG. 1 illustrates a part of a honeycomb type of cellular overlay on a mobile communication area for defining approximately the principal communication subareas associated with respective sets of radio frequency channels. Although the term "mobile" often connotes a motor-vehicle-mounted unit, the term is not so restricted and can embrace any portable radio station.

In the center of the honeycomb arrangement of hexagonal cells in FIG. 1 is a set of seven cells numbered 1 through 7. Each of those seven cells is assigned a different set of communication channels. For present purposes, it is immaterial whether each cell has a centrally located omnidirectional antenna system or each cell has a directional antenna system with antennas located, for example, at respective alternate corners of each hexagonal cell representation.

Surrounding the central set of cells in FIG. 1 is a ring of six further cell sets, each having the same overall channel set as does the aforementioned central cell set, although only the upper left-hand cell in each set of the ring is numbered with the numeral "1" to facilitate cell set location. Additional cell sets can be added in any direction as may become necessary to suit the needs of the radiotelephone traffic to be handled. It has been found that there usually is no significant cochannel interference between cells using the same set of channels in this arrangement because cells in which a common channel set is reused are not closer to one another than a distance of D units, approximating the diameter of a cell set, for a cell radius of R units, and wherein the ratio D/R equals approximately 4.6 for the seven-cell hexagonal grid of FIG. 1. Stated differently, the cells are advantageously proportioned and operated so that a signal-to-interference ratio of at least 17 dB prevails over at least 90% of the cell area. Such a ratio allows the frequency modulation capture effect to suppress an otherwise interfering signal.

Of course, various events can cause signal fades or surges that can result in cochannel interference. Thus, Rayleigh fading, produced as a mobile station is moved, can cause brief bursts of such interference. Also, shadow effects caused by a mobile station passing behind, with respect to its base station, some topological formation such as a hill or a building can also cause fading. In addition, the peaking effect produced by a mobile station passing over the top of a high hill can produce a signal surge of significant duration. It has been found that higher channel utilization results if cell patterns need not be so large as to prevent all cochannel interference in spite of the aforementioned signal fading and surging types of occurrences.

Figure 2:
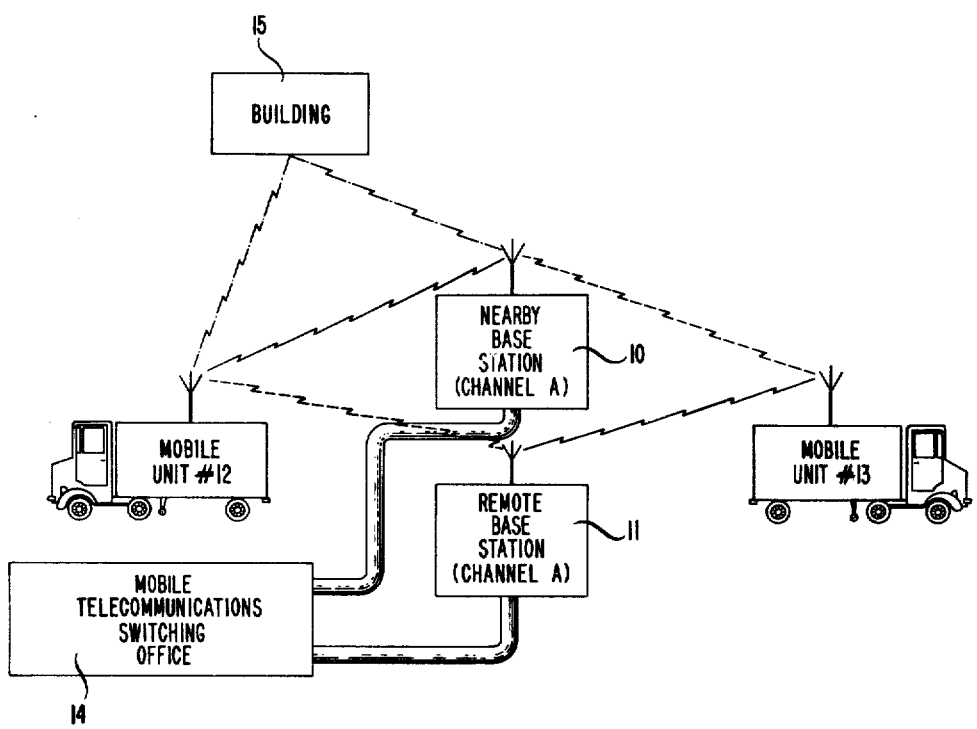

In FIG. 2 there are shown two base stations: a nearby station 10 and a remote base station 11 which are both utilizing the same communication channel as schematically represented in the block in the drawing by the term "Channel A" for each base station. The term "base station" is here used to indicate all channel transmitters and receivers of radio energy as well as the equipment located at the same site for utilizing them. Such totality is sometimes in the literature called a cell site. A mobile telecommunication switching office (MTSO) 14 is connected to each base station by a separate circuit for each channel at that station. All of the separate circuits are schematically represented by a cable extending from the MTSO to each base station. These two base stations are assumed to be a distance D apart in different cell sets as hereinbefore indicated with respect to FIG. 1. Accordingly, although both stations are utilizing the same communication channel, each has a different supervisory audible tone (SAT) modulated on its respective transmissions in that channel.

Also shown in FIG. 2 are two mobile units 12 and 13 which are located in the cells of, and for primary communication with, the base stations 10 and 11, respectively, as schematically represented by the solid jagged lines extending between antennas. However, due to some signal fading or surging phenomena, such as those of the type hereinbefore mentioned, the mobile units 12 and 13 may also find themselves in at least limited communication with the base stations 11 and 10, respectively, as indicated by the broken jagged lines extending between the antennas of unit 12 and station 11 and between the antennas of unit 13 and station 10.

For example, a signal fading condition of some kind may cause the mobile unit No. 12 to capture transmission from the base station 11 instead of that on the same channel from the base station 10 even though the mobile unit No. 12 is still being adequately heard by the base station 10. In the latter circumstance, the mobile unit No. 12 will transpond the SAT of base station 11 and the nearby base station 10 will detect the lack of SAT verification in the transmission from mobile unit 12. Alternatively, the aforementioned fading condition with respect to mobile unit No. 12 may not result in its capture of the remote base station transmission 11, but it may enable the nearby base station 10 to capture transmissions from the mobile unit 13 even though the latter unit is still being adequately received by the remote base station 11. Here again, the nearby base station 10 would also detect a lack of SAT verification on its channel A.

The cochannel interference indicated by the lack of SAT verification in a station can indicate the presence of conditions which result in annoyance to radiotelephone subscribers during short interference bursts. In addition, if the lack of SAT verification continues long enough, a loss of supervision may result causing erroneous termination of a call in process.

Also shown in FIG. 2 is a building 15 which schematically represents any building or other topographical or atmospheric situation causing reflections of radio signal transmissions between, for example, the mobile unit 12 and the base station 10. Such a reflection path is represented in FIG. 2 by the jagged dash-dot lines extending from the mobile unit antenna to the building 15 and then to the antenna of the base station 10. As previously noted herein, such a reflection path signal arrives at the base station 10 antenna in a different phase relationship from the transmission directly to the antenna from the mobile unit 12, and the resultant phase dispersion causes the station's frequency modulation discriminator for the channel to produce sidebands within about ±10 Hz of any SAT to complicate the determination of the correct SAT and thereby the determination of mobile unit range.

Figure 3:
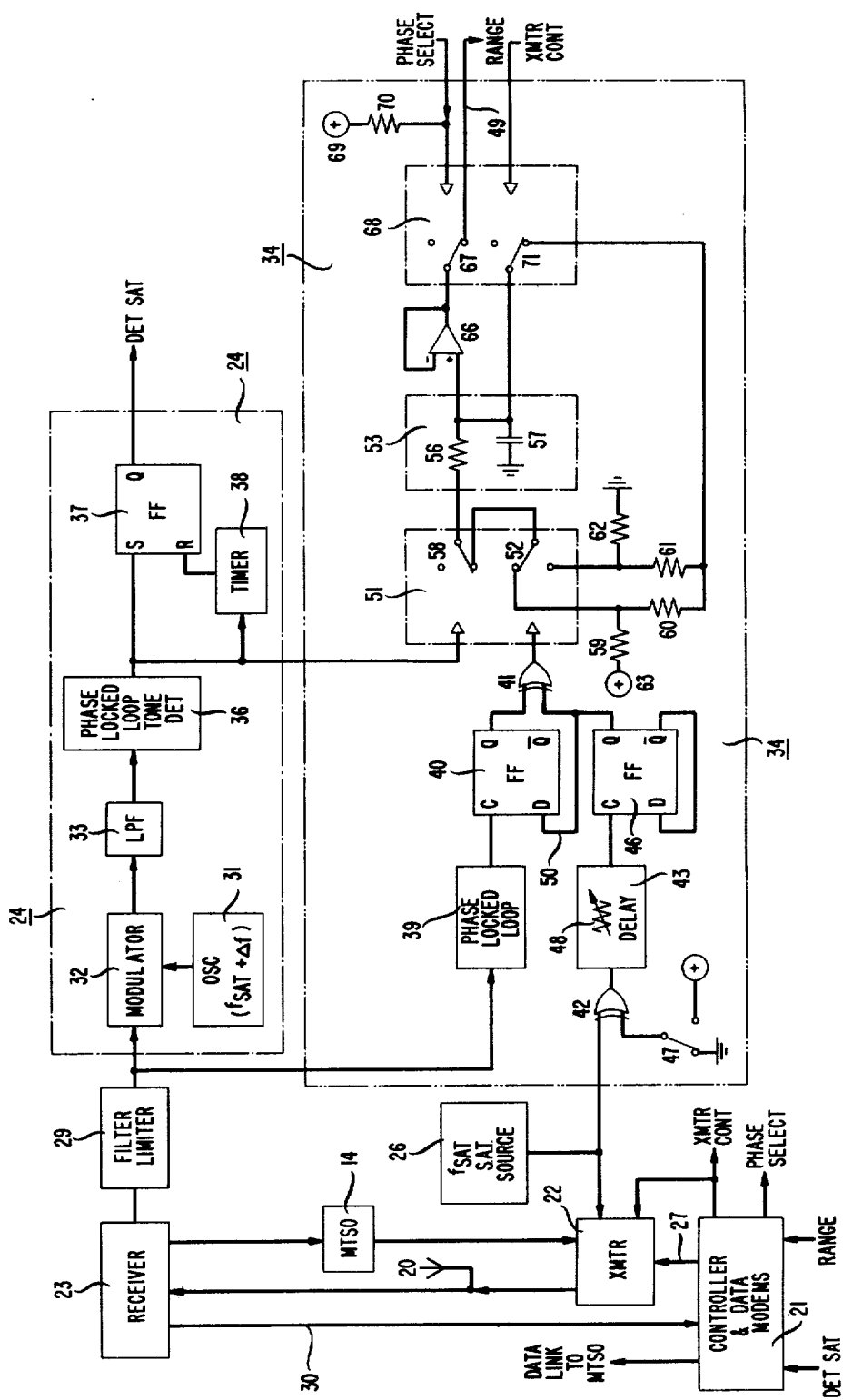

FIG. 3 shows block and line circuits for detecting a correct SAT and using the detected SAT for determining the range between two radio stations. The circuits of FIG. 3 are shown and described in terms of equipment located at a fixed station, such as the station 10 in FIG. 2; but the system could equally well be arranged to have the equipment of FIG. 3 located in a mobile unit. Individual circuit components shown in FIG. 3 are all known in the art and details thereof comprise no part of the present invention.

A common antenna 20 is schematically used to indicate both transmitting and receiving antenna functions for the equipment. A controller 21 determines cell site equipment operation in the station 10 in accordance with operating procedures of a type which are now known in the art. These procedures include exercising control over the operation of a channel transmitter 22 and a channel receiver 23 and their associated circuits. The controller 21 further includes a data modulator and demodulator designated "modem" for such data communication as is required to take place among a mobile unit, the base station, and the mobile telecommunication switching office (MTSO) 14. All the circuits in FIG. 3 other than the antenna, the controller 21, and a local SAT signal source 26 are duplicated for each channel as the cell site but only the single set shown in FIG. 3 need be considered for understanding the invention. The channel equipment is the same for each channel at the base station.

The transmitter 22 receives call voice signals from the MTSO and modulates those signals along with a SAT frequency $f_{SAT}$ from a SAT signal source 26 onto a transmission carrier for the channel. Data from the MTSO is transmitted to the base station on circuits (also in the mentioned cables to respective base stations) which are separate from the voice circuits and are applied to the modem in the controller 21. Those data signals which are intended for the mobile unit for a particular channel are applied by way of a circuit 27 to the transmitter 22 of that channel. The transmitter is turned on and off in accordance with a predetermined operating program as directed by a transmitter control signal XMTR CONT from the controller 21.

The receiver 23 is a frequency modulation receiver and provides from its discriminator output after filtering the call voice signals on a circuit 28 to the MTSO. The receiver also provides the voice and SAT signals to a filter-limiter 29 which is common to circuits to be described for providing detection of the presence of the correct SAT for the fixed station cell site and for processing received signals to determine the range out to the mobile unit which transmitted those signals. Data contained in received signals in receiver 23 is supplied to the controller 21 by way of a circuit 30.

Filter-limiter 29 receives signals including voice and SAT and advantageously includes two stages of integrated circuit amplifiers such as, for example, the Western Electric 502AR amplifier chips and their respective associated resistors and capacitors to provide the desired characteristics. Thus in one embodiment, the input filter stage advantageously reduces voice frequency energy below 3000 Hz to a level below that of energy around 6000 Hz and passes tones in a band at a frequency of about 6000 Hz which includes all of the SATs of the sytem. A second, or limiter, stage is arranged to provide a noise limiting function for preventing overdrive to circuits 32 and 39 to be described.

A branch circuit 24 in FIG. 3 processes received signals to indicate whether or not correct SAT is present. An oscillator 31 is advantageously a crystal oscillator which is operated at a frequency ($f_{SAT}+\Delta f$) which is the sum of the SAT frequency for the base station using the equipment of FIG. 3 plus a predetermined lower frequency $\Delta f$. The frequency $\Delta f$ is selected to have a value which is much lower than the $f_{SAT}$ tone and which is substantially different from the frequency spacing between adjacent SATs. In one illustrative embodiment, a frequency $\Delta f$ of 100 Hz was employed for a system having SATs in the 6 kHz range.

The received signals from filter-limiter 29 and a local reference frequency signal from the oscillator 31 are applied to the two inputs, respectively, of a product modulator such as the Motorola MC1496 modulator chip and its associated resistors and capacitors arranged to cause the modulator to operate in a down converting mode. In such a mode the modulator performs a linear mixing to produce the sum and difference frequencies from the two input signals applied thereto. A low pass filter 33 couples the output of modulator 32 to the input of a phase-locked loop tone detector 36. Filter 33 advantageously has a cutoff frequency of about 150 Hz for a system employing a $\Delta f$ frequency of 100 Hz.

The tone detector 36 is configured to respond to the $\Delta f$ frequency with a tolerance range which is much less than the spectral spacings between the desired SAT and either of the possible adjacent system SATs or their respective multipath sidebands. The output signal of the toe detector 36 is a logic level signal of a predetermined minimum amplitude when the correct SAT is being provided in the voice signals from the filter-limiter 29. Thus, it is within the skill of the art to use, for example, either the Western Electric Company 502ER phase-locked loop chip or the EXAR Integrated Systems phase-locked loop chip EXAR2211 with their respective associated resistors and capacitors for enabling the loop to select the $\Delta f$ tone required for the station with a tolerance of approximately ±4%. In such an arrangement, for example, for a station having an assigned SAT of 5970 Hz, the tone detector 36 rejects outputs from the filter 33 of 40 Hz (in regard to a SAT of 6030 Hz) or 70 Hz (in regard to a SAT of 6000 HZ). Also rejected are other frequencies usually within a range of about ±10 Hz from either of those 40 or 70 Hz tones) which represent difference frequencies resulting from multipath sidebands around the 6030 Hz and 6000 Hz tones as applied from the filter-limiter 29.

Tone detector 36 output of the indicated minimum logic level sets a flip-flop circuit 37 to provide a DET SAT signal to controller 21 indicating that the correct SAT is present. This enables the controller to use that information in accordance with the usual station operating procedures. Output from the detector 36 is also applied to an input of a timer 38 for automatically resetting the flip-flop 37 after a predetermined interval following loss of the correct SAT, i.e., loss of the predetermined minimum amplitude indicator signal from the detector 36. The minimum interval is set by system requirements at a level which is the longest interval tolerable for radio link fade of sufficient depth to cause loss of accurate SAT reception. An interval of 175 milliseconds, ±25 milliseconds, was found to be suitable for one embodiment of the invention in a cellular radio system.

The function of the timer 38 can be provided by means of a monostable multivibrator. However, the 175 millisecond interval is rather long in some senses and thus may require a rather large timing capacitance for the monostable multivibrator and large capacitances are sometimes hard to implement in integrated semiconductor technology. Alternatively, an oscillator-counter combination is advantageously employed to the same effect, i.e., the oscillator is triggered into activity upon loss of the output signal from the detector 36 and begins to drive the counter in the chip. If the detector output is shortly restored, the oscillator is reset and no output is provided from the timer 38. However, if the detector output is lost for at least the indicated minimum interval, the counter is driven to a predetermined count level corresponding to that interval and provides an output for resetting the flip-flop 37 as already mentioned. One oscillator-counter chip is the Western Electric Company 41HK oscillator/counter delay integrated circuit chip which is coupled to associated resistors and capacitors to provide the delay operation in the manner just outlined.

The ranging processing of the received signals is accomplished in a branch circuit 34 in FIG. 3 by a two-way ranging propagation delay technique wherein a comparison is performed between the phase information contained in a reference signal, such as the locally generated SAT from the source 26 which is transmitted on the transmission channel, and the phase information in the SAT of a received signal, such as the SAT transponded by a remote mobile unit and received with the voice signals back at the base station receiver 23. The comparator output in such an arrangement is then integrated to provide an output signal magnitude which is indicative of the required range information as will be described. The received signal from the filter-limiter 29 is coupled to the phase ranging branch circuit 34 of the FIG. 3 circuit at an input to a phase-locked loop 39. The phase-locked loop 39 detects signals in the SAT band and reconstructs a tone which it finds there. For correct operation, that tone will be the transponded tone from the mobile unit engaged in a call on the channel being served through the base station circuits illustrated in FIG. 3. Thus, for the indicated SATs a signal selection in the band of 6000 Hz ±4% is readily within the skill of the art and prevents interference from voice signals and call progress tones. For example, a Western Electric Company 502EP phase-locked loop integrated circuit chip and its associated resistor and capacitor circuits, or a Motorola NLN565C phase-locked loop chip with its associated resistors and capacitors, will readily perform in the manner just outlined. An output of the phase-locked loop 39 is applied to a clock input of a D-type flip-flop circuit 40, and the Q output of that flip-flop circuit is applied to one input of an EXCLUSIVE OR logic gate 41.

The transmitted SAT from the source 26 is coupled through an EXCLUSIVE OR gate 42 and a delay circuit 43 to the clock input of a further D-type flip-flop circuit 46. A second input to the EXCLUSIVE OR gate 42 is provided through a selection switch 47 from either ground or a positive potential, depending upon the position of the switch, so that the gate can couple the SAT in either its true form or with a 180-degree phase shift for a purpose to be described. The amount of delay provided by delay circuit 43 is advantageously continuously manually adjustable over a range of about 180 electrical degrees for signals in the illustrative SAT band around 6000 Hz. This manual adjustment is schematically represented in FIG. 3 by the variable resistor 48 included in the schematic representation of the delay in the drawing. Thus, switch 47, gate 42, and the adjustable resistor 48 together allow substantially full 360 electrical degrees of phase adjustment. That capability advantageously employed for calibration of the circuits of FIG. 3 to provide a zero-range output signal level on a RANGE output lead 49 for a mobile unit located as close as practical to the base station antenna 20.

The Q output of the flip-flop circuit 46 is coupled back to the data, or D, input of the same flip-flop circuit. The Q output of the flip-flop 46 is coupled to the D input of the flip-flop 40 as well as to a second input on the EXCLUSIVE OR gate 41. Delay circuit 43 is made up advantageously of two tandem connected monostable multivibrators. The first of the two has the adjustable resistor 48 connected in its timing circuit for adjusting the interval between triggering and automatic reset. The second of the two monostable multivibrators responds to the output of the first on reset to provide a narrow but clean, steep-sided pulse of usually less than 50% duty cycle for clocking the flip-flop circuit 46 at the time indicated by the delayed SAT pulse. Outputs of the flip-flop circuits 40 and 46 are both symmetrical square waves. The lead 50 coupling the Q output of flip-flop 46 to the data input of flip-flop 40 forces the latter flip-flop to operate approximately in step with the former flip-flop but as clocked from the phase-locked loop 39. One cannot forecast in which state each flip-flop will begin to operate when the circuit is first powered up or, for flip-flop 40, after any arbitrary input signal interruption of signal from loop 39. However, lead 50 forces the states of flip-flop 40 to track those of flip-flop 46 with a phase difference specified by the clock signals from loop 39. Thus, the two flip-flop circuits cannot remain out of track with one another beyond a brief get-into-step interval and thereby provide erroneous ranging indications as a result of a possible 180-degree phase ambiguity between their outputs.

As earlier noted, the EXCLUSIVE OR gate 41 operates as a phase comparator with respect to the Q outputs of the flip-flop circuits 40 and 46. The output of EXCLUSIVE OR gate 41 is, therefore, high when its two input signal states are different, i.e., of different polarities; and it is low when those two inputs are the same, i.e., of the same polarity.

In phase ranging systems, the measurable range is a function of the electric wavelength of the signal used for the ranging operation. For SAT signals in the 6 kHz range, i.e., a wavelength of 31 miles, a vehicle range (½ the sum of the round trip transmission and return distances) of about 15 miles is conveniently measurable by phase comparison. There is, however, a phase ambiguity beyond the first half wavelength distance of about 7.5 miles because the EXCLUSIVE OR type of phase comparator is sensitive to input signals having the same polarity or having different polarities but without reference to which half cycle of any signal wave is involved. This causes some trouble in systems with, for example, 8 mile radius cells. This difficulty is resolved by dividing the frequencies of the compared signals, e.g., by dividing those frequencies by two in the illustrative embodiment using flip-flop circuits 40 and 46. Then on the frequency divided signal a 180-degree half wave portion is equivalent in wavelength to a full cycle of the SAT of the received wave, and the ambiguity thus disappears.

The output of EXCLUSIVE OR gate 41 controls one section of an analog switch 51 wherein the switch section is schematically represented by a mechanical switch 52 but is in actuality advantageously a field effect transistor switch. By controlling the switch section 52, the output of EXCLUSIVE OR gate 41 selects one of two diferent input drive bias signals for an integrator circuit 53 including a series resistor 56 and a shunt capacitor 57. The bias signal thus selected is coupled through a switch section 58 of the same switch 51 to the integrator 53. The bias sources are provided, for example, from a potential dividing arrangement including four resistors 59 through 62 connected in series between ground and a positive voltage supply 63 schematically represented by a circled positive sign to indicate a supply having its other terminal connected to ground. The upper terminal of switch 52 is connected to the dividing arrangement at a lead 54 between resistors 59 and 60 to provide, for example, a voltage of approximately 7.6 volts and similarly the lower terminal of the switch 52 is connected to the dividing arrangement at a lead 55 between resistors 61 and 62 to provide a voltage of approximately 0.8 volts. Those two voltages represent the maximum and minimum, respectively, output voltages available from the integrator circuit 53. The maximum voltage value represents maximum range, i.e., about 15 miles in the illustrative embodiment and the minimum voltage value represents a level near, but not exactly equal to, the minimum range, or zero range, value for a reason to be subsequently described. The employment of the indicated potential dividing arrangement advantageously utilizing a regulated supply and 1% precision resistors makes the integrator circuit input bias signals independent of chip-to-chip variations in the circuit elements of the phase comparing EXCLUSIVE OR gate 41. One switch suitable for the analog switch 51 is the AD7512KN analog switch made by the Analog Devices Corporation.

The output of the integrator 53 is coupled to a noninverting input of an amplifier 66 which is advantageously arranged to operate as a voltage follower. This amplifier, one form of which is advantageously the LF356 amplifier of the National Semiconductor Corporation, has its output coupled back to an inverting input of the amplifier and also coupled through a switch section 67 of another analog switch 68 to provide a RANGE signal on the lead 49 to the controller 21. Switch 67 is controlled by a PHASE SELECT signal provided from the controller 21. Normally a positive voltage from a supply 69 is applied through a resistor 70 to hold the switch 67 open in the absence of the PHASE SELECT signal. Thus, the latter signal when it appears causes the output of amplifier 66 to be sampled as the RANGE signal.

When the channel transmitter 22 is on, a transmitter control signal XMTR CONT operates another switch 71 in the analog switch 68 to the open condition. However, when the transmitter is off, the XMTR CONT signal closes switch 71 in the fashion illustrated in FIG. 3 for putting a low intermediate bias on the off-ground terminal of the integrator circuit capacitor 57. This action dumps any prior charge that had been on that capacitor and clamps the capacitor to a predetermined low voltage level very near to the minimum range voltage previously described. Accordingly, the integrator 53, when so biased, is in a condition to adapt rapidly to any new input signals applied thereto when the transmitter 22 resumes operation.

In the illustrative embodiment, the mentioned intermediate bias level is advantageously close to the minimum, e.g., 1.2 volts for a system wherein the minimum voltage is 0.8 volts. That 1.2 volt value is advantageously considered to be the zero-miles range indication so that on initial calibration of the channel circuits variable resistor 48 in the delay 43 is operated to set the output of the integrator circuit 53 to 1.2 volts and thereby allow a 0.4 volt range below that value in which to work for establishing the zero-miles calibration. With this arrangement, the calibration is effected by a continuous adjustment of the resistor 48 to close in on the 1.2 volt value. Absent this kind of arrangement, i.e., if 0.8 volts were the zero-mile level, any overshoot during adjustment would allow the indication to snap back and forth between the 0.8 volt level and the 7.6 volt level as the measured phase difference shifted, e.g., between small leading and lagging values.

Radio frequency fades present a pervasive problem in mobile radiotelephone systems as already noted. During a prolonged fade, the phase-locked loop 39 may lose the SAT and the EXCLUSIVE OR gate 41 may then see a relatively continuous large phase difference and cause the integrator circuit 53 to be driven erroneously to a high level indication. This situation is avoided by utilizing a lead 72 for coupling the output of phase-locked loop tone detector 36 to control the section switch 58 in analog switch 51 to maintain that switch closed, as illustrated, during proper reception of the predetermined SAT signal. However, during a fade when that SAT is lost, the switch 58 is operated to its open circuit condition to present the integrator circuit 53 with a very high input impedance. That holds integrator operation at whatever level had just been attained, subject of course to whatever leakage takes place through either that high impedance open switch condition or the high impedance at the input to the amplifier 66. At the end of the fade, the signal on lead 32 closes the switch 58 once more; and normal integration operation resumes.

In mobile radiotelephone systems, when a call signal level deteriorates toward a limiting transmission condition, e.g., due to distance from the base station or shadowing by a topographical feature, the voice transmission can break up and be difficult to understand. However, it has been found that the intermittent spurts of adequate signal are sufficient to continue good ranging operation in circuit 34 because integration is prevented between those spurts by the signals coupled by lead 72. Thus, if the system takes signal strength samples during spurts of adequate signal strength, it can get a false picture of call signal quality; but the continuing accurate range information can show whether or not the mobile unit is about to pass into a different cell.

Although the present invention has been described in connection with a particular embodiment thereof, it is to be understood that other embodiments, modifications, and applications thereof which will be apparent to those skilled in the art are included within the spirit and scope of the invention.

I claim:

1. In a system for communication of radio signals including a predetermined tone and other information signal frequencies and including means for comparing (41) the phases of transmitted and transponded versions of said predetermined tone and integrating (53) the output of the comparing means to indicate range between transmitting and transponding stations of the system, the phase comparing means being CHARACTERIZED IN THAT they comprise means for processing (46) said transmitted tone to produce a wave at a fraction of the frequency of said transmitted tone, means for processing (40) said transponded tone to produce a wave at a frequency which is a fraction of the frequency of said transponded tone, and means for providing (41) a binary indication in a first state when said fractional-frequency waves are of the same polarity and in a second state when they are of different polarities.

2. In a system for communication of radio signals including at least a predetermined tone and including means (34) for indicating approximate range through which received radio signals have been propagated, the improvement comprising means for detecting (24) the presence or absence of said predetermined tone in said received radio signals, and means, responsive to an output of said detecting means, for inhibiting (72, 58) operation of said indicating means during an interval of radio signal level reduction sufficient to cause said detecting means to indicate absence of said predetermined tone.

3. The system in accordance with claim 2 CHARACTERIZED IN THAT a plurality of said tones are employed in said system, and the detecting means comprises means for producing (31) a reference tone differing by a predetermined frequency $\Delta f$ from one of said predetermined tones, the frequency $\Delta f$ being much less than the frequency of such one tone but being greater than the spectral, frequency spacing between adjacent ones of said predetermined tones, and means for bandpass filtering (36) the output of said producing means to select said frequency $\Delta f$.

4. The system in accordance with claim 3 in which the received signals sometimes include phase dispersed versions of such signals and the system is further CHARACTERIZED IN THAT the bandpass filtering means has a passband which is sufficiently narrow to exclude producing means output signals resulting from phase dispersed versions of at least said predetermined tones other than said one tone.

5. The system in accordance with claim 3 CHARACTERIZED IN THAT the detecting means further comprises means, responsive to an output of said filtering means, for setting (37) an output signal indicating detection of said one tone, and means, responsive to said filtering means, for resetting (38) said output signal after a predetermined interval of absence of said frequency $\Delta f$.

6. The system in accordance with claim 2 CHARACTERIZED IN THAT means are provided for transmitting radio signals including said predetermined tone, and the indicating means includes means for comparing (41) the phases of said predetermined tone of said transmitting means and of the predetermined tone of said received radio signals, and means for integrating (53) the output of said comparing means to produce a signal having a magnitude corresponding to said approximate range.

7. The system in accordance with claim 6 CHARACTERIZED IN THAT said indicting means includes means (43) for fixing the zero-range output indication from said integrating means at a level somewhat higher than the minimum output level of said integrating means.

8. The system in accordance with claim 6 CHARACTERIZED IN THAT means are provided for clamping (71) said integrating means to a predetermined integration state in the absence of said transmitting means radio signals.

9. The system in accordance with claim 6 CHARACTERIZED IN THAT there are provided means for coupling (51) said comparing means to said integrating means and comprising first and second means (54, 55) for supplying bias voltages of different magnitudes which are independent of component values in said comparing means but are selectable by the output signal of said comparing means, and means, responsive to first and second predetermined conditions of the output of said comparing means, for selecting (52) different ones respectively of the bias supplying means for application to the input of the integrating means.

10. The system in accordance with claim 6 CHARACTERIZED IN THAT said detecting means comprises means for producing (31) a reference tone differing by a predetermined frequency $\Delta f$ from the transmitting means tone, the frequency $\Delta f$ being much less than the frequency of the latter tone, a plurality of said predetermined tones are employed in said system, said frequency $\Delta f$ being greater than the spectral spacing difference frequencies between adjacent ones of said plurality of predetermined tones, and means for bandpass filtering (36) the outputs of said producing means to select said frequency $\Delta f$, and means, responsive to the output of said filtering means, are provided for halting (72, 58) changes in the operation of said integrating means during absneces of said difference frequency $\Delta f$ in such output.

11. The system in accordance with claim 10 CHARACTERIZED IN THAT said halting means comprises first electic signal responsive switching means (58) having, with respect to the impedance of the integrating means, a low impedance coupling between said comparing and integrating means when closed and a high impedance when opened substantially to prevent leakage of accumulated signal from said integrating means, first and second supplies (54, 55) of bias voltage of different magnitudes which are independent of component values of said comparing means, second electric signal responsive switching means (52), responsive to the output of said comparing means, for coupling a selectable one of said first and second bias voltage sources to an input of said integrating means, and means, responsive to a detecting means signal indicating whether or not the one tone is present, for opening said first switching means to prevent bias source responsive changes in the integrating means operating state for the duration of intervals of the absence of such one tone.

12. The system in accordance with claim 6 CHARACTERIZED IN THAT said phase comparing means comprises means for processing (46) said transmitting means tone to produce a signal wave at a fraction of the frequency of such tone, means for processing (39, 40) received radio signals to produce therefrom a signal wave at an integral fraction of frequency of the predetermined tone thereof, and means, responsive to outputs of both aforementioned processing means, for providing (41) a binary signal indication having a first state when such outputs are of the same polarity and a second state when such outputs are of different polarities.

13. The system in accordance with claim 12 CHARACTERIZED IN THAT there are provided in addition means for coupling (50) said transmitting means tone processing means output to gate the received radio signal tone processing means operation so that the output signal state of the latter means tracks the output signal state of said transmitting means tone processing means output by a phase difference determined primarily by the phase difference between the transmitting means tone and the received signal predetermined tone.

14. The system in accordance with claim 12 CHARACTERIZED IN THAT there are provided in addition means for adjusting (42, 43, 47) the relative phase of the two fractional frequency signals so that the output of said integrating means indicates zero units of range when said approximate range is actually at its minimum value.

* * * * *